Patented Aug. 18, 1936

2,051,170

UNITED STATES PATENT OFFICE 2,051,170

WRAPPING MATERIAL FOR AN EDIBLE PRODUCT

John Helfrich, Westfield, N. J., assignor to Newark Paraffine & Parchment Paper Co., Newark, N. J., a corporation of New Jersey No Drawing. Application November 29, 1933, Serial No. 700,374

4 Claims. (Cl. 99—171)

My invention relates to a new and improved method of inhibiting the growth of mold spores and to a new and improved wrapping material for articles which are affected by the growth of mold spores.

One of the objects of my invention is to prevent or lessen the growth of mold spores on articles such as bread, cake, crackers, cheese, meats, yeast and other edible products.

Another object of my invention is to provide an improved wrapping material in which the inhibiting agent is incorporated, either in the form of a surface layer or otherwise.

Another object of my invention is to provide a material which is hygroscopic and which has a mild alkaline reaction so that said material can operate at a temperature which is favorable for the growth of mold spores, in order to inhibit such growth.

Another object of my invention is to preserve the above mentioned products under conditions which inhibit the growth of mold spores.

Other objects of my invention will be set forth in the following description which illustrates a preferred embodiment thereof, it being understood that the above general statement of the objects of my invention is intended merely to generally explain the same and not to limit it in any manner.

It has been well known for many years that bread and allied products, protein foods such as cheese and meats, and yeast, have been attacked by various mold spores such as *Rhizopus nigareus, Aspergillus niger, Pencillium expansium*.

This has occurred even when it has been attemped to protect said edible products by means of wrapping material made of waxed paper, regenerated viscose such as "Cellophane", cellulose acetate, tin or lead or aluminum foil, parchment paper, glassine paper, etc.

According to my invention I treat the above mentioned wrapping materials by coating them on one or both sides with an aqueous solution of a suitable amine. I prefer to only coat one side of the wrapping material, and I prefer to use a paper which has been impregnated and coated with a mineral wax, as a wrapping material. This wax may be paraffine wax as said wax is inert and it is not attacked by alkalis, since it does not contain any fatty acid. Hence the amine does not chemically combine with the inert wax although it forms a thin and highly adherent layer upon the wax.

I prefer to utilize triethanalamine or monoethanalamine in an aqueous solution and having a strength of about 3% to 5% by volume.

While I do not wish to be limited to the specific examples or substances specified herein, I can utilize a solution of 3 gallons of triethanalamine in 97 gallons of water. The total volume of the mixture thus made is 100 gallons and I consider that this is in effect a solution of the triethanalamine in the water.

Likewise I can intermix 95 gallons of water with 5 gallons of monoethanalamine. I can use either distilled water or any suitable pure water and the intermixing is accomplished at an ordinary room temperature of about 70 F.

In addition to monoethanalamine, diethanalamine and triethanalamine, I can use other substances having similar properties. For example I can use other amines such as monoamylamine, diamylamine, and triamylamine.

I do not wish to limit myself to the use of the amines as the above mentioned substances merely exemplify the general type of substance or substances which may be utilized. The above mentioned substances are miscible with water and they have a mild alkaline or basic reaction.

Likewise they are known emulsifying agents although I do not believe that their emulsifying powers play any part in the invention. They adhere to waxes such as paraffine wax, and they also adhere to aluminum foil.

In order to treat a paper which is impregnated and coated with paraffine wax, the protective substance can be rubbed or otherwise applied upon the wrapping material in the form of a thin layer. The water either evaporates quite rapidly or it may be taken up to some extent by the wax, thus leaving a thin film of the protective material. This film may be intermixed with a certain amount of moisture.

In order to favor the growth of a mold upon an edible material, three basic factors are involved.

There must be a certain amount of humidity and ordinarily the edible material must have at least 18% of moisture, with a surface humidity which is at least 70%.

Likewise, in order to favor the growth of a mold the temperature must be at least 60° F.

Likewise I have discovered that the growth of the mold is favored by an acid condition in the culture medium, such as the bread or the like. The fermentation which is produced by the mold results in the formation of various acids such as acetic acid, butyric and lactic acid.

My invention is particularly useful in protecting freshly sliced bread. The bread may be wrapped in an air-tight manner by means of a wrapping material which has been treated according to my invention.

The protective materials above mentioned have very high vapor pressure so that they do not evaporate readily from the wax paper or metal foil.

Hence a wrapping material which has been treated according to my invention can be stored for a substantial period of time without losing the protective power although it is possible to utilize the wrapping material immediately after the protective material has been applied thereto.

Since the protective material is hygroscopic and mildly alkaline, it eliminates two of the conditions which are necessary for the growth of molds.

When the material is used for wrapping yeast, it contacts with the six outer faces of the block of yeast, in order to supply the desired protection.

Generally speaking my invention relates to any system in which I control the moisture condition and/or the acid condition above mentioned, which are necessary for the growth of spores.

The use of the amines above mentioned fulfills two of these conditions, because said amines are somewhat hygroscopic and they have mildly basic reactions. Likewise they do not injure the crust of bread.

The layer of protective material which is applied to the wax coating of the paper is very thin. Upon standing some of the water is evaporated, especially if the paper is held in an atmosphere which is relatively dry.

When the article to be protected is enclosed by the improved wrapping material, the protective material absorbs the surface moisture of the cake of yeast or the like, and the protective material also neutralizes any surface acidity.

While I have specified a large number of substances which may be utilized, I do not wish to be limited to said substances or to the classes of substances mentioned herein. There are numerous other materials which are non-toxic if they are present in minute proportions, and which either neutralize an acid condition, or which absorb surface moisture.

If the improved wrapping material is used for wrapping a loaf of bread which has been cut into slices, said slices should be pressed against each other so as to exclude air and moisture, intermediate the lateral surfaces of such slices.

I have shown a preferred embodiment of my invention, but it is clear that numerous changes and omissions could be made without departing from its spirit.

I claim:

1. A wrapping material for an edible product, said wrapping material having its inner face coated with a thin layer of a non-poisonous, mildly hygroscopic, mildly alkaline amine.

2. The product of claim 1 wherein the amine is an ethanolamine.

3. Waxed wrapping material having a surface film of a non-poisonous, hygroscopic, mildly alkaline amine.

4. The product of claim 3 in which the surface film is an ethanolamine.

JOHN HELFRICH.